A. FORD.
Corn Harvester.
No. 91,005.
2 Sheets—Sheet 1.
Patented June 8, 1869.
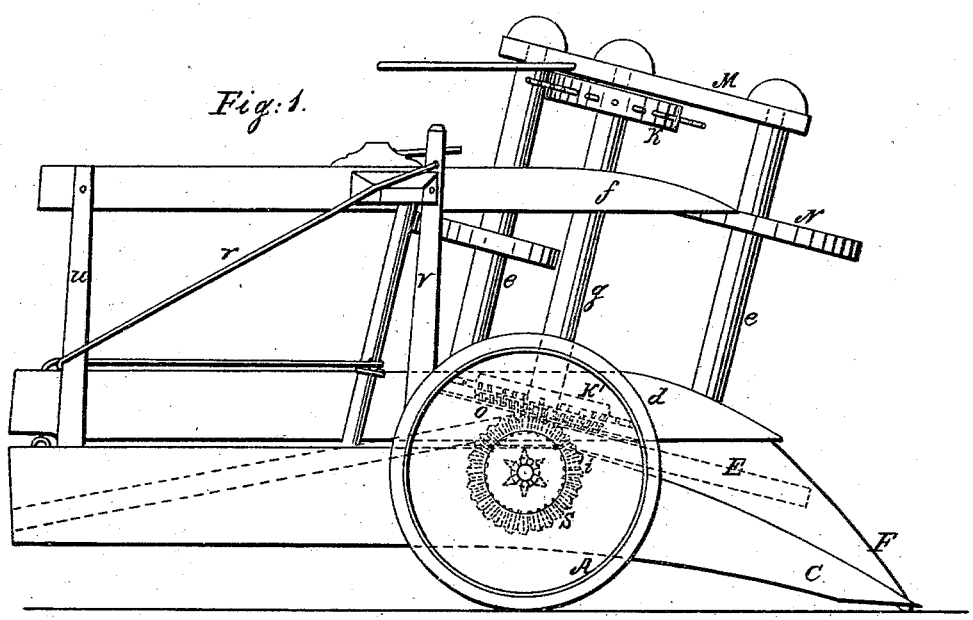
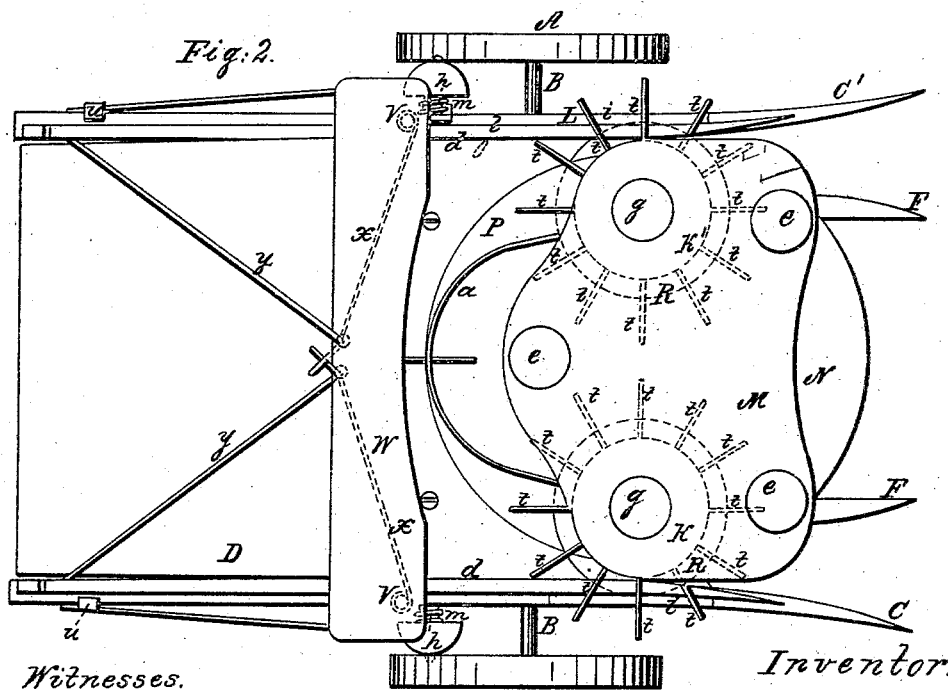
Witnesses.
Jno. A. Ellet
J. V. White
Inventor.
A. Ford
Per J. H. Alexander
Atty

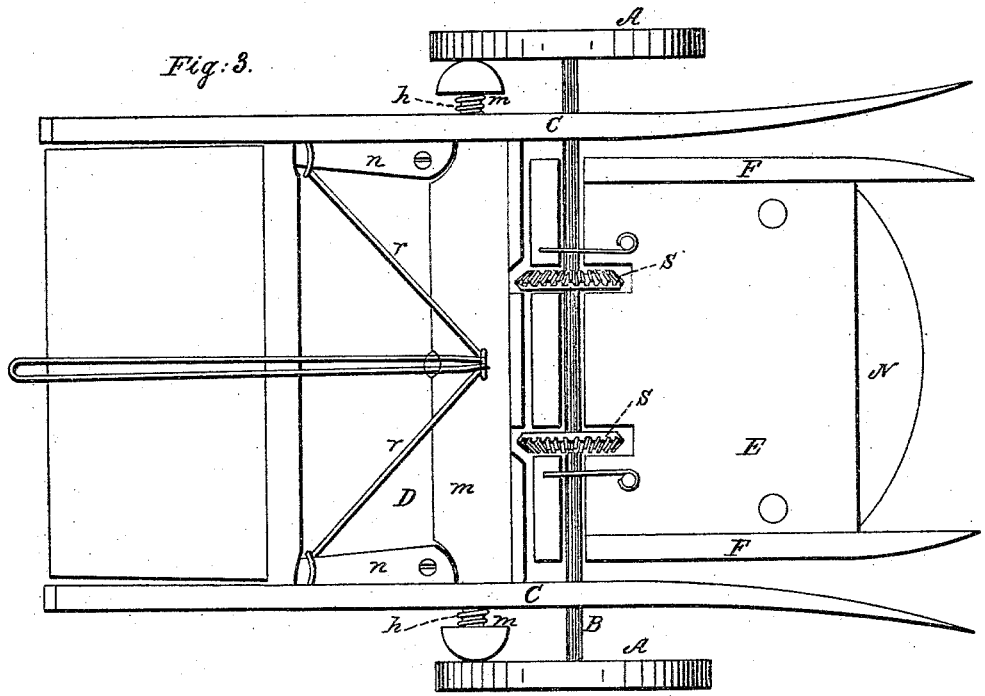

United States Patent Office.

AMANDER FORD, OF TOLEDO, OHIO.[*]

Letters Patent No. 91,005, dated June 8, 1869

---

IMPROVEMENT IN CORN-HARVESTERS.

---

The Schedule referred to in these Letters Patent and making part of the same.

---

*To all whom it may concern:*

Be it known that I, AMANDER FORD, of the city of Toledo, in the county of Lucas, and State of Ohio, have invented certain new and useful Improvements in Corn-Harvesters; and I do hereby declare that the following is a full, clear, and exact description thereof, reference being had to the accompanying drawings, and to the letters of reference marked thereon, which form a part of this specification, in which—

Figure 1 is a side elevation of my corn-harvester.

Figure 2 is a plan view of the same.

Figure 2 is a plan view of the machine when inverted.

My invention consists of a corn-cutter, furnished with two circular and two straight knives, and with guides to conduct the corn-stalks to said knives. It also consists in making the two main guides adjustable, so that they will expand to adapt themselves to the distance of the corn rows apart. It also consists of several devices for holding the stalks in an upright position until they reach the point of discharge, in the manner set forth.

In the annexed drawings—

A represents the wheels, and B the axle.

The axle B is made to pass through the two guides C C, the said guides constituting the rim of platform D.

Directly in front of platform D is a second platform, E, the sides of which are furnished with guides F F.

The said guides are pointed at their front ends, and point slightly inward.

Immediately above guides C C are the additional guides d d and f f, which correspond in shape with guides C C, but are made shorter.

The object of guides d and f is to keep the stalks in an upright position while subjected to the cutting-process.

M and N represent two additional platforms placed above platform E, the upper platform M being designed to support the uprights e e e and also the shafts g g on which the toothed wheels K and K' are hung.

The platform N is circular in front, and serves to give direction to the stalks after they have entered between the guides C C and F F.

O O designate two bevel-wheels on shafts q q, the said wheels being placed directly under the toothed wheels K and K', and gearing into corresponding wheels S S, on the axle B.

To the rear of platforms M and N is the small platform P, semicircular in shape, and designed to conduct the stalks to the centre of platform D after being cut.

R R represent the circular knives, one of which is secured to each of the shafts q q, directly under the toothed wheels K and K'.

I I designate two other knives, which are fastened, at a slight descending angle, on the top of guides, C C, and directly under the toothed wheels K and K'.

X X represent two metal rods, the outer ends of which are secured to uprights, u, fig. 1, then coiled around upright V, and terminating at the centre of platform D, at which point they are fastened to two cords y y, the said cords being made to pass partly around bars u u, through the tops of bars V V, and then attached to the adjustable cross-bar W.

n n represent two levers, placed at the bottom of platform D, and inside of guides C C.

To the end of each of said levers is fastened a cord, I, which passes through a staple at the bottom of bar m, and then returns to the hands of the operator.

It will be observed that as the corn-stalks accumulate in front of bar W they will force the said bar back, and will also press against rods X X, and force them back.

When a sufficient quantity of stalks is collected to form a shock, the bar W will be loosened at one end, and the stalks slid off the platform D.

It will be also remarked that the semicircular rod a, at the rear of platform M, is intended to act as a guide to bring the upper end of the stalks to the centre of bar W.

In order to complete the adaptation of the guides C C to the distance of the rows apart, a spiral spring, h, is coiled around each end of bar m, outside of guides C C, the said spring occupying the space between guides C C, and the knobs on the end of bar m, and acting on guides C C.

Having thus described my machine,

What I claim, and desire to secure by Letters Patent, is—

1. The adjusting or expanding guides C C, arranged to operate substantially as and for the purpose set forth.

2. The knives I I, in combination with the expanding-guides C C, substantially as and for the purpose described.

3. The combination of stationary guides F F, with expanding-guides C C, as and for the purpose specified.

4. A corn-stalk cutter, consisting of toothed wheels K K', circular knives R R, guides C C and F F, bar W, rods X X, semicircular guide a, and stationary knives I I, all combined substantially as and for the purpose set forth.

In testimony that I claim the foregoing as my own, I affix my signature, in presence of two witnesses.

AMANDER FORD.

Witnesses:
 GEO. STEBBINS,
 M. B. DOYLE.

[*] Assignor to himself & A. T. Babbitt of the same place.